United States Patent
Pursifull et al.

(10) Patent No.: US 8,181,629 B2
(45) Date of Patent: *May 22, 2012

(54) ENGINE AND EXHAUST HEATING FOR HYBRID VEHICLE

(75) Inventors: Ross Dykstra Pursifull, Dearborn, MI (US); Gopichandra Surnilla, West Bloomfield, MI (US); Nate Trask, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/197,653

(22) Filed: Aug. 3, 2011

(65) Prior Publication Data

US 2011/0288713 A1  Nov. 24, 2011

Related U.S. Application Data

(63) Continuation of application No. 12/841,855, filed on Jul. 22, 2010, now Pat. No. 7,997,252, which is a continuation of application No. 12/266,095, filed on Nov. 6, 2008, now Pat. No. 7,762,232.

(51) Int. Cl.
*F02P 5/00* (2006.01)
(52) U.S. Cl. .............. 123/406.12; 123/339.11
(58) Field of Classification Search .............. 123/406.12, 123/406.23, 406.53, 406.55, 339.11, 179.5, 123/179.28; 290/34, 35, 40 R, 40 A, 40 B, 290/40 C; 180/65.21, 69.3, 65.1
See application file for complete search history.

(56) References Cited

U.S. PATENT DOCUMENTS

| | | | |
|---|---|---|---|
| 6,085,723 A | 7/2000 | Pels et al. | |
| 6,109,237 A | 8/2000 | Pels et al. | |
| 6,334,431 B1 | 1/2002 | Kanehiro et al. | |
| 6,615,785 B2 | 9/2003 | Weiss | |
| 6,655,339 B1 | 12/2003 | Orr | |
| 7,159,566 B2 | 1/2007 | Tomita et al. | |
| 7,305,965 B2 | 12/2007 | Zillmer et al. | |
| 7,762,232 B2 * | 7/2010 | Pursifull et al. | 123/406.12 |
| 7,840,337 B2 | 11/2010 | Zillmer et al. | |
| 7,950,368 B2 * | 5/2011 | Pursifull et al. | 123/406.53 |
| 7,997,252 B2 * | 8/2011 | Pursifull et al. | 123/406.12 |
| 2004/0055283 A1 | 3/2004 | Iihoshi et al. | |
| 2010/0108031 A1 | 5/2010 | Pursifull et al. | |
| 2011/0226215 A1 * | 9/2011 | Pursifull et al. | 123/329 |

FOREIGN PATENT DOCUMENTS

| | | | |
|---|---|---|---|
| JP | 2004027998 A | 1/2004 | |
| JP | 2005299567 A | 10/2005 | |
| WO | 2006123836 A1 | 11/2006 | |

* cited by examiner

*Primary Examiner* — Hai Huynh
(74) *Attorney, Agent, or Firm* — Allan J. Lippa; Alleman Hall McCoy Russell & Tuttle LLP

(57) ABSTRACT

A method for controlling a vehicle engine having a plurality of cylinders and an electric motor configured to rotate the engine is provided. The method includes, during engine idling, advancing spark timing of at least one cylinder to substantially before a peak torque timing. The method further includes adjusting motor torque output of the electric motor to maintain engine idle speed.

13 Claims, 9 Drawing Sheets

FIG. 2
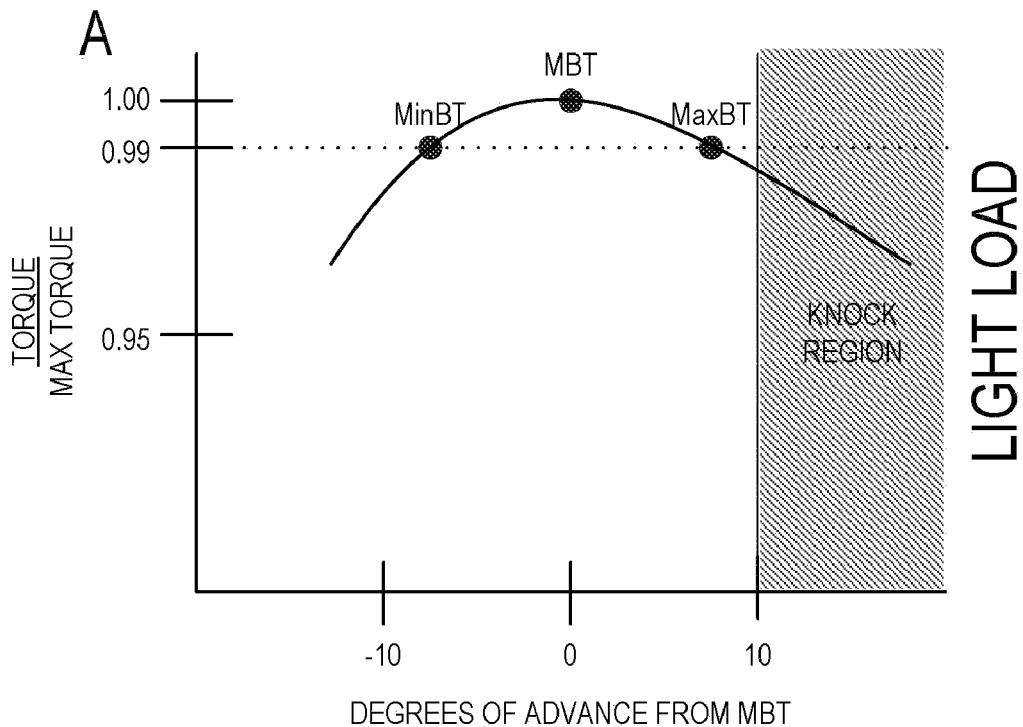
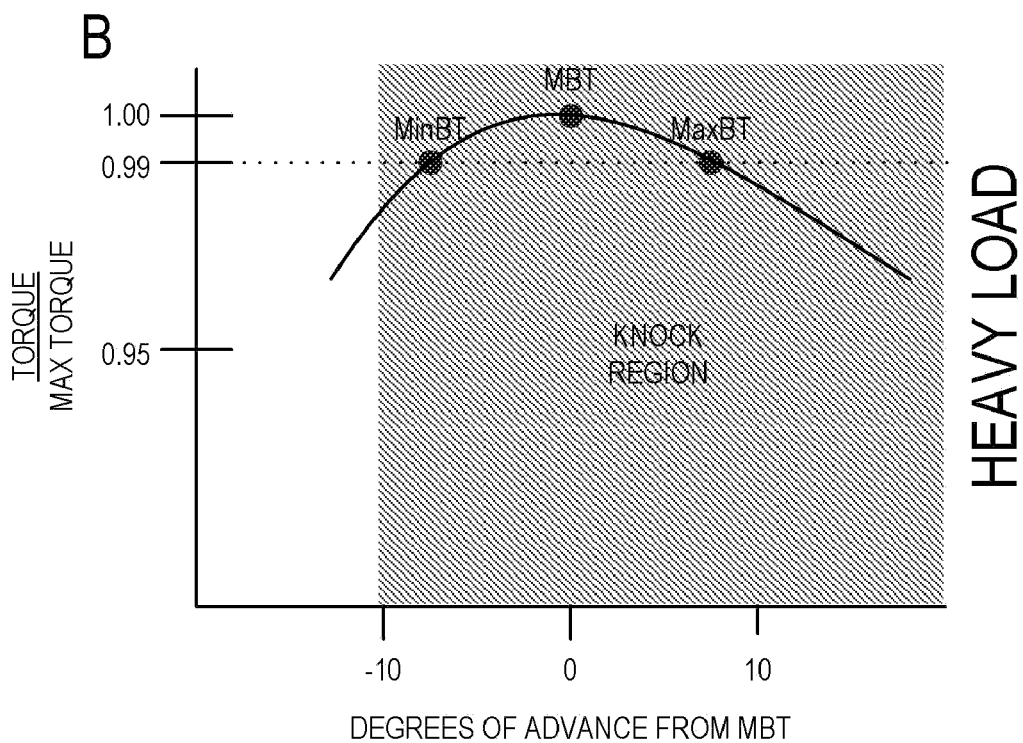

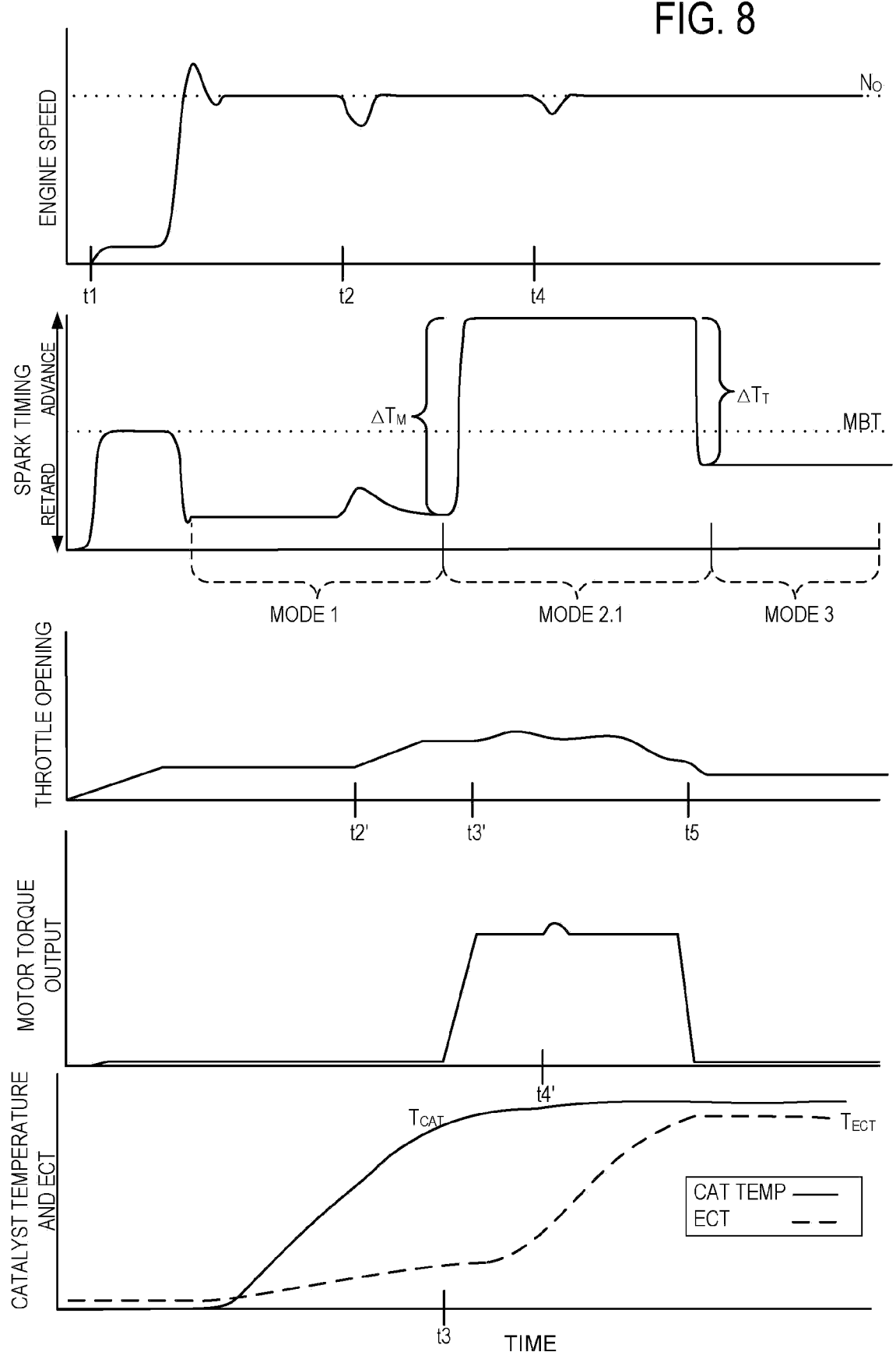

ENGINE AND EXHAUST HEATING FOR HYBRID VEHICLE

CROSS REFERENCE TO RELATED APPLICATIONS

The present application is a continuation of U.S. patent application No. 12/841,855 filed Jul. 22, 2010, which is a continuation of U.S. patent application No. 12/266,095, filed on Nov. 6, 2008, entitled "Engine and Exhaust Heating for Hybrid Vehicle" the entire contents of which are incorporated herein by reference.

FIELD

The present application relates to a system for controlling idle engine speed control after a cold start in a hybrid vehicle.

BACKGROUND AND SUMMARY

An engine of a vehicle can operate in an idle condition during stationary or other related vehicle conditions. During cold start engine idle conditions, various systems may utilize waste engine heat to hasten engine warm-up, thereby enabling improved emission performance, engine efficiency, etc. As one example, waste exhaust heat may be adjusted to more rapidly increase catalyst temperature, thereby reducing emissions. Likewise, waste heat in the engine cooling system and/or lubricating system may be directed to the cabin for cabin heating or to the lubricating system, thereby reducing lubricant viscosity thus reducing friction. For example, spark timing may be retarded from MBT during initial starts to first heat an exhaust catalyst, and then once the catalyst is heated, spark timing may be advanced to before MBT to more rapidly heat engine coolant and/or lubricants to thereby provide increased engine efficiency.

One approach for adjusting engine operation during cold starting conditions is described in U.S. Pat. no. 6,334,431, which describes a method for utilizing spark timing advance past minimum spark advance for best torque (MBT) timing when the engine is under cold start conditions and after catalyst light-off to heat engine coolant. The advance value is based on engine coolant temperature, intake air temperature, engine speed, and manifold absolute pressure. Specifically, at engine speeds between 2000-2500 RPM, the spark timing advance is decreased as engine speed increases, and vice versa. Further, below 2000 RPM, the spark timing is independent of engine speed.

The inventors herein have recognized problems with the above approaches. As one example, at idling conditions when heating the engine coolant via advance timing past MBT, idle speed control may degrade. In particular, if spark timing is further advanced from an advanced timing relative to MBT in response to speed drops, the potential for engine stalls may increase. Further, if significantly advanced spark timing is desired to provide increased waste heat, combustion stability may decrease and, further, airflow increases may be insufficient to maintain sufficient engine torque to continue engine rotation at the desired idle speed.

The above issues are addressed by a method for controlling a vehicle engine having a plurality of cylinders and an electric motor configured to rotate the engine, comprising: during engine idling, advancing spark timing of at least one cylinder to substantially before a peak torque timing, and adjusting motor torque output of the electric motor to maintain engine idle speed.

By taking advantage of the torque reserve generated by the advanced spark timing used for increasing heat to engine coolant and/or lubricant, it is possible to improve idle speed control under such conditions. For example, by retarding spark timing in response to a drop in engine speed (while remaining advanced relative to MBT), it is possible to provide a rapid increase in engine torque, with only minor and likely temporary effects on heat delivered to the engine coolant and/or lubricant. As such, improved idle engine speed control can be achieved with reduced stalls while warming the engine. For example, the above approach can provide quick-acting torque reserve with the option of directing waste engine heat to the exhaust or the engine coolant, respectively. In this example, the directional choice of waste heat delivery can be achieved without impacting the level of torque and while maintaining torque reserve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A and 2B show movement of the knock limit region as a function of engine load.

FIG. 8 is a chart demonstrating example operation under various conditions according to one example embodiment.

DETAILED DESCRIPTION OF THE DRAWINGS

Figure 1A:
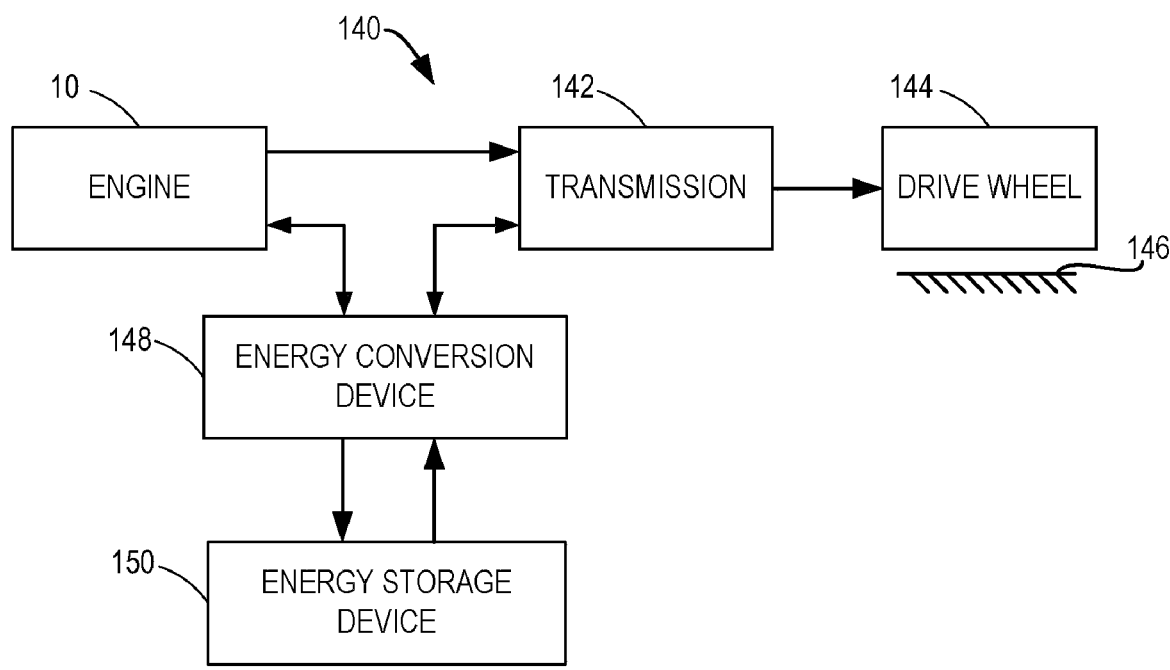
FIG. 1A shows a hybrid propulsion system.

Referring to FIG. 1A, the figure schematically depicts a vehicle with a hybrid propulsion system 140. Hybrid propulsion system 140 includes an internal combustion engine 10, further described herein with particular reference to FIG. 1B, coupled to transmission 142. Transmission 142 may be a manual transmission, automatic transmission, or combinations thereof. Further, various additional components may be included, such as a torque converter, and/or other gears such as a final drive unit, etc. Transmission 142 is shown coupled to drive wheel 144, which in turn is in contact with road surface 146.

In this example embodiment, the hybrid propulsion system 140 also includes an energy conversion device 148, which may include a motor, a generator, among others and combinations thereof. The energy conversion device 148 is further shown coupled to an energy storage device 150, which may include a battery, a capacitor, a flywheel, a pressure vessel, etc. The energy conversion device 148 can be operated to absorb energy from vehicle motion and/or the engine and convert the absorbed energy to an energy form suitable for storage by the energy storage device (i.e., provide a generator operation). The energy conversion device can also be operated to supply an output (power, work, torque, speed, etc.) to the drive wheels 144 and/or engine 10 (i.e., provide a motor operation). It should be appreciated that the energy conversion device 148 may, in some embodiments, include only a motor, only a generator, or both a motor and generator, among various other components used for providing the appropriate conversion of energy between the energy storage device 150 and the vehicle drive wheels 144 and/or engine 10.

The depicted connections between engine 10, energy conversion device 148, transmission 142, and drive wheel 144 indicate transmission of mechanical energy from one component to another, whereas the connections between the energy conversion device 148 and the energy storage device 150 may indicate transmission of a variety of energy forms such as electrical, mechanical, etc. For example, torque may be transmitted from engine 10 to drive the vehicle drive wheels 144 via transmission 142. As described above energy storage device 150 may be configured to operate in a generator mode and/or a motor mode. In a generator mode, energy conversion device 148 absorbs some or all of the output from engine 10 and/or transmission 142, which reduces the amount of drive output delivered to the drive wheel 144, or the amount of braking torque to the drive wheel 144. Such operation may be employed, for example, to achieve efficiency gains through regenerative braking, improved engine efficiency, etc. Further, the output received by the energy conversion device may be used to charge energy storage device 150. In another example, the energy conversion device may supply mechanical output to engine 10 and/or transmission 142, for example by using electrical energy stored in an electric battery.

Hybrid propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 1 may be controlled by a vehicle controller as will be described below with reference to FIG. 1B.

From the above, it should be understood that the exemplary hybrid propulsion system is capable of various modes of operation. In a full hybrid implementation, for example, the propulsion system may operate using energy conversion device 148 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 144. In still another mode, which may be referred to as an "assist" mode, the energy conversion device 148 or an alternate torque source may supplement and act in cooperation with the torque provided by engine 10. As indicated above, energy conversion device 148 may also operate in a generator mode, in which torque is absorbed from engine 10 and/or transmission 142. Furthermore, energy conversion device 148 may act to deliver torque to the engine or absorb torque from the engine during idle speed control of engine 10.

Figure 1B:
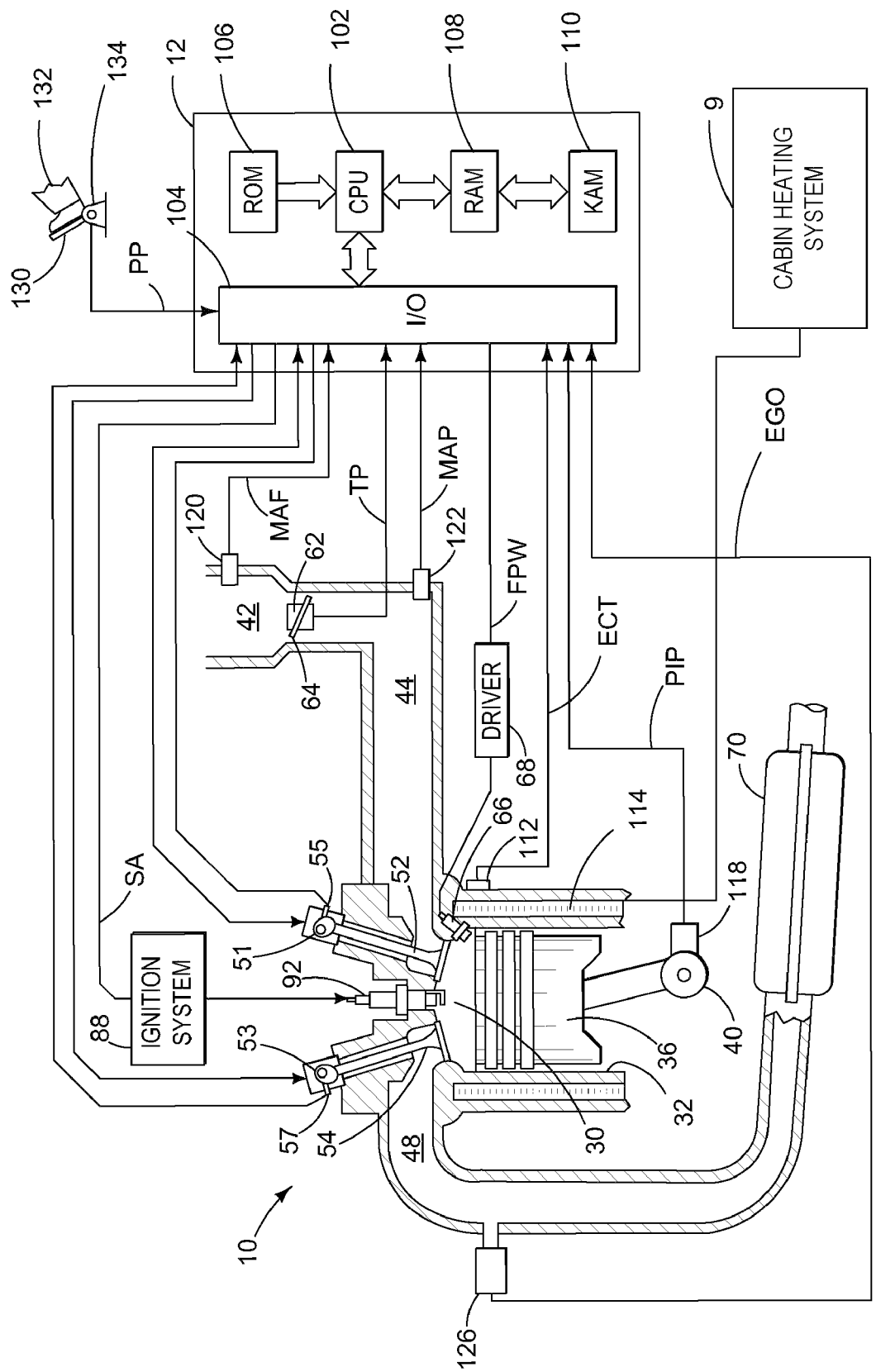
FIG. 1B shows an example of a direct injection engine with cam actuation systems.

FIG. 1B is a schematic diagram showing one cylinder of multi-cylinder engine 10, which may be included in a propulsion system of a vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted on the side of the combustion chamber or in the top of the combustion chamber, for example. Fuel may be delivered to fuel injector 66 by a fuel delivery system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The exhaust system may include light-off catalysts and underbody catalysts, as well as exhaust manifold, upstream and/or downstream air-fuel ratio sensors. Converter 70 can include multiple catalyst bricks, in one example. In another example, multiple emission control devices, each with multiple bricks, can be used. Converter 70 can be a three-way type catalyst in one example.

Controller 12 is shown in FIG. 1B as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof. The engine cooling sleeve 114 is coupled to the cabin heating system 9.

As described above, FIG. 1B shows only one cylinder of a multi-cylinder engine, and each cylinder may similarly include its own set of intake/exhaust valves, fuel injector, spark plug, etc.

Referring now to FIGS. 2A and 2B, these graphs illustrate example knock constraints at light and heavy engine loads, respectively. Each graph shows generally how, for a given fuel and air amount in the cylinder, spark timing affects scaled engine output torque (e.g., engine torque over the peak engine torque). Specifically, it shows an example peak torque timing (MBT), with retarded timings relative to MBT on the left, and advanced timings relative to MBT on the right of MBT. Further, the graph illustrates a range of peak torque timings (MinBT to MaxBT).

As illustrated, engine knock may constrain available spark timing to a greater extent as engine load increases, especially with respect to advanced timing past MBT. For example, FIG. 2A shows the knock constraint only at spark timings advanced past approximately 10 degrees of advance past MBT, whereas FIG. 2B shows the knock constraint even at 10 degrees retarded from MBT.

FIG. 2A illustrate that during light loads, knock constraints may enable operation at an advanced timing past MBT, at least under some conditions. Light loads may comprise a majority of idling operation, at least after the initial catalyst warm-up operation, and therefore may be operated with spark timing advanced past MBT. As such, in various examples described herein, such operation may be used to increase heat to the engine coolant and/or engine lubricants to improve performance.

Referring now to FIGS. 3-7, various flowcharts describe example operations of idle speed control. Specifically, during idle conditions, the engine is adjusted to maintain a minimum engine speed even if the operator is not requesting engine output. For example, an engine control system may adjust engine airflow and/or spark timing to maintain idling operation and compensate for disturbances such as actuation of the steering system, engagement of a climate control air conditioning (A/C) compressor, etc. In idle engine speed control, the control system may retain a torque reserve, in which it is possible to rapidly increase engine output to maintain idle engine speed and compensate for disturbances such as those noted above, via spark timing adjustments. In addition, the control system may modulate the motor torque output of the energy conversion device 148 to maintain idle engine speed and compensate for disturbances.

One mode for maintaining sufficient torque reserve during idling conditions of the spark ignition engine includes nominally operating at retarded spark timing relative to MBT timing. Such an approach can also coordinate with cold starting conditions, in which retarded spark timing is provided to increase exhaust heat provided to an exhaust emission control device (e.g., catalyst 70) to improve its light-off performance. In this example, the spark timing may be adjusted responsive to engine speed feedback to enable rapid increases or decreases in engine torque to maintain accurate idle speed control, while also substantially maintaining increased exhaust heat to the catalyst 70. Specifically, spark timing may be advanced relative to the nominal spark timing to enable a rapid increase in engine torque.

However, once the catalyst has reached light-off temperature, for example, a second mode may be used in which the engine nominally operates at an advanced timing relative to MBT to increase heat rejected to engine coolant and/or lubricants, and quicker reduction of combustion chamber heat loss as compared to retarded spark timing relative to MBT. In this description, two examples of said second mode are presented (e.g. sub-modes 2.1 and 2.2). For example, in an assist sub-mode 2.1, the spark timing may be substantially over-advanced before the peak torque timing such that the cylinders with said timing produce substantially no output torque. In this example, the remainder of the torque required to maintain idle speed may be provided by a motor coupled to the engine. In another example, such as sub-mode 2.2, the spark timing may be advanced before the peak torque timing such that the cylinders with said timing may produce some torque. In the example sub-mode 2.1, other cylinders of the engine with spark timing not overly advanced (e.g., at MBT, or advanced/retarded from MBT, but producing substantial torque) may compensate to maintain idle engine speed.

Further, in the second mode, with nominally advanced spark timing, the spark timing of cylinders with overly advanced timing can also be adjusted responsive to engine speed feedback to enable rapid increases in engine torque to maintain accurate idle engine speed control, while providing excess heat to the cabin at zero fuel cost. For example, when operating in this mode, the spark timing can be retarded with respect to the nominal spark timing to enable a rapid increase in engine speed. That is, if there is a torque disturbance that reduces engine speed, spark timing can be retarded to increase engine torque and counteract the reduced speed. Further, in an assist mode, a motor torque output can be increased to counteract the reduced speed. By the examples presented above, the likelihood of stalling is substantially reduced.

By operating over-advanced of the peak torque timing in the second mode, a significant amount of heat may be provided (e.g., for cabin heating), while idle speed control may still be maintained via the motor and/or by adjusting the overly advanced spark timing and/or the spark timing of cylinders that are not over-advanced.

After delivering sufficient heat to the engine coolant and/or lubricant (e.g., once a desired engine coolant temperature is achieved), the engine may be operated in a third idle mode. In this third mode, spark timing is retarded relative to the peak torque timing so that a sufficient torque reserve is maintained, but with less overall spark retard from MBT as compared with the first mode. For example, the magnitude of retard relative to the peak torque timing may be substantially less than that of the first mode so that higher efficiency of the engine is achieved (e.g., torque output over maximum torque output).

During idle speed control, transitioning between the above-mentioned modes involves maintaining the engine torque during the transition; thereafter, the desired spark timing associated with each mode (e.g., determined by desired catalyst temperature, desired engine coolant temperature, maintaining engine coolant temperature with sufficient torque reserve, etc.) may be gradually reached by concurrently adjusting spark timing for the cylinder(s) selected for adjustment and overall airflow (e.g., via adjustment of throttle 62). Furthermore, transitions may be achieved through adjustment of the spark timing and motor torque output, where engine torque disturbances generated by adjusting the spark may be compensated via the motor torque output.

Further, the number of cylinders operating with advanced, or retarded, spark timing relative to MBT may be adjusted to one, some, or all of the engine cylinders depending on operating conditions. For example, during the first and third modes, all of the cylinders of the engine may be operated with nominally retarded spark timing, with the timing of all of the cylinders adjusted responsive to idle speed control deviations. However, during mode 2.2, a subset of the engine cylinders may be operated with spark timing nominally advanced (and adjusted responsive to idle speed control deviations), with remaining cylinders operated with spark timing at MBT (and not adjusted responsive to idle speed). Alternatively, in assist sub-mode 2.1, all of the cylinders may be operated with an overly advanced spark timing with the motor torque output responsive to idle speed control deviations.

Figure 3:
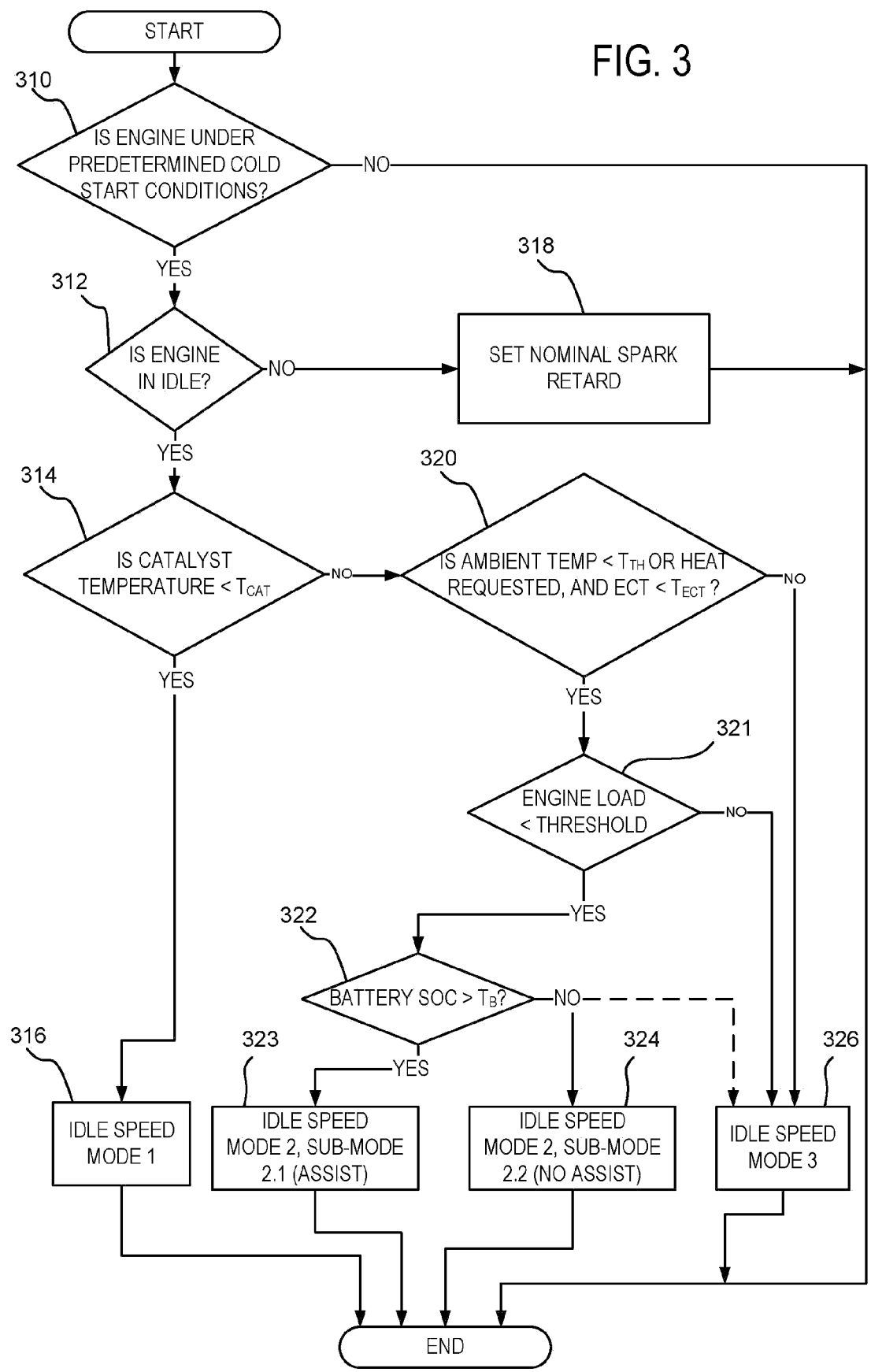
FIG. 3 is a flowchart for selecting an idle speed control mode.

FIG. 3 illustrates determination of an idle speed control mode. If it is determined that the engine 10 is under cold start conditions (e.g., engine coolant temperature is approximately equivalent to ambient temperature) at 310 and the engine is in idle at 312, the routine proceeds to 314 where catalyst temperature is compared to a predetermined threshold $T_{CAT}$, which may be associated with a catalyst light-off temperature. Idle conditions may be identified based on vehicle speed being below a threshold value and/or based on a release of pedal 72 by the vehicle operator, for example.

If catalyst temperature is less than $T_{CAT}$, idle speed mode 1 is selected at 316. Mode 1 may operate with a nominal spark timing retarded from peak torque timing sufficient to increase exhaust temperature and thus more rapidly warm exhaust emission components.

Further, in mode 1, the spark timing is adjusted about the nominal timing to control idle speed around a desired idle speed. For example, spark timing may be advanced relative to the nominal timing (while still being retarded from peak torque timing) to increase engine output torque and thereby counteract drops in idle speed or to counteract external loads placed on the engine. As another example, spark timing may be further retarded relative to the nominal timing (while still being retarded from peak torque timing) to decrease engine output torque and thereby counteract increases in idle speed or to counteract external loads removed from the engine. Additionally, airflow adjustments, via the throttle, may be coordinated with the spark timing retard and adjustments to maintain the spark timing on average around the nominal timing, while also on average maintaining the desired idle speed. Additional details of mode 1 are described in FIG. 5.

If catalyst temperature is at least equal to $T_{CAT}$ 314 it is determined whether additional heat of combustion is to be transferred to engine coolant and/or engine lubricants (e.g., via advancing of spark timing past peak torque timing) 320. In one example, the routine determines whether an ambient temperature is less than a predetermined threshold $T_{TH}$ or vehicle cabin heating is requested by occupants or automated climate control system, and also whether engine coolant temperature is less than a predetermined threshold $T_{ECT}$ at 320.

If so, the routine continues to 321 to determine whether the engine is in a lower engine idle load region. For example, the routine may determine whether engine load (e.g., as determined based on manifold pressure, engine torque, etc.) is less than a threshold. Further, the threshold may be based on engine knock limits such that, under light load conditions, spark timing is also responsive to knock detection. Further still, the magnitude of spark timing advance past peak torque timing may be limited to avoid encountering knock limitations. In an alternate example, the routine may detect a knock threshold.

If the answer to 321 is yes, it is determined if the battery state of charge (SOC) is greater than a predetermined threshold $T_B$ 322, in this example. If the battery SOC is sufficiently high, mode 2 is entered and idle speed control is achieved with the assist sub-mode 2.1 at 323. If the battery SOC is not sufficiently high, idle speed sub-mode 2.2 is entered 324. In both sub-mode 2.1 and sub-mode 2.2, spark timing will be advanced relative to the peak torque timing; these modes are further described in FIGS. 6-7.

Specifically, in one example, mode 2, may include operation with a nominal spark timing advanced from peak torque timing sufficient to increase heat rejected to engine coolant and/or lubricants to more rapidly decrease engine friction, provide cabin heating, reduce exhaust heat flow, etc. Further, the spark timing may be adjusted about the nominal timing to control idle speed to a desired idle speed. For example, spark timing may be retarded relative to the nominal timing (while still being advanced from peak torque timing) to increase engine output torque and thereby counteract drops in idle speed or to counteract external loads placed on the engine. As another example, spark timing may be further advanced relative to the nominal timing (while still being advanced from peak torque timing) to decrease engine output torque and thereby counteract increases in idle speed or to counteract external loads removed from the engine. Additionally, throttle adjustments may be coordinated with the spark timing advance and adjustments to maintain the spark timing on average around the nominal timing, while also on average maintaining the desired idle speed.

As another example, if battery SOC is not sufficiently high at 322, idle speed mode 3 may be entered at 326 to avoid entering a knock region. Idle speed mode 3 is further described with respect to FIG. 5.

Referring again to FIG. 3, if engine load is greater than the predetermined threshold 321, or the answer to 320 is no, the routine sets the idle speed control mode to idle speed mode 3 at 326. In one example, even when increased heating of the engine may be advantageous (e.g., to increase cabin heating), if such operation may result in engine knock or degraded idle speed control (due to insufficient torque reserve as limited by knock), the routine selects mode 3 to maintain sufficient idle speed control. In this way, knock limits may be taken into account and reduced. Further, when engine heating is completed, the routine may also select mode 3 to provide more fuel efficient idling with reduced exhaust or engine heating.

If the engine is not in idle at 312, a nominal spark retard is determined and set at 318.

In this way, the routine as depicted in FIG. 3 can select among the various idle modes to provide improved performance under a variety of conditions.

The above example modes may also have various alternative implementations. In one example, all cylinders of the engine may be operated about a nominal timing as set by the various modes. For example, in mode 2, each cylinder may be operated about the same nominally advanced spark timing, with each cylinder's spark timing being adjusted responsive to the current desired and actual engine speed according to a control routine, such as a PID controller as described herein below. However, in another example of operation in mode 2, some cylinders may have a first nominal spark advance, and other cylinders may have a second nominal spark advance greater (e.g., more advanced) than the first nominal spark advance. In this case, spark timing may be adjusted responsive to differences in the desired and actual speed for only the cylinders with the second nominal spark advance, whereas the cylinders with the first nominal spark advance may be independent of the idle speed control feedback. Alternatively, even in the case where the cylinders have a different nominal spark advance, all of the cylinders may be adjusted responsive to idle speed control feedback. In one particular example, the second nominal spark advance may be set to a substantially advanced spark timing such that combustion torque is substantially reduced such that significant heat can be delivered to the engine coolant and/or lubricating system from those cylinders. Thus, in another example, some cylinder(s) may have different nominally advanced spark timing and, to modulate engine torque, some cylinder(s) may further advance relative to the nominal spark timing thereby reducing engine torque and other cylinder(s) may retard relative to the nominal spark timing thereby increasing engine torque (while all cylinders are still advanced relative to MBT). Further, when operating in assist sub-mode 2.1, all cylinders may be over-advanced such that substantially no torque is produced and the hybrid motor is engaged to maintain rotation of the engine and thus to maintain idle engine speed. Alternatively, in assist sub-mode 2.1, some cylinders with nominally advanced spark timing may provide engine output torque supplemented by the motor torque output.

Likewise, similar modifications can be used in modes 1 and/or 3. For spark timing adjustments in modes 1 or 3, for example, all cylinders may undergo the same nominal spark timing retard. Alternatively, all cylinders may be retarded relative to peak torque timing but all cylinders do not have the same spark timing. Still, the spark timings of each or a subset of cylinders can be advanced or retarded independently to maintain idle speed. In one example, all cylinders may have the same nominally retarded spark timing and each cylinder's spark timing can retard or advance to modulate engine torque. For example, all cylinders may retard or advance similarly (e.g., with a common magnitude of change). In another example, some cylinder(s) may have different nominally retarded spark timing and, to modulate engine torque, some cylinder(s) may further retard relative to the nominal spark timing thereby reducing engine torque and other cylinder(s) may advance relative to the nominal spark timing thereby increasing engine torque (while all cylinders are still retarded relative to MBT). Further still, all cylinders may have over-retarded spark timing to increase rapidity of catalyst warming such that substantially no torque is produced by the engine. In this case, motor torque output may be provided to maintain idle engine speed. Alternatively, some cylinders with nominally retarded spark timing may provide engine output torque supplemented by the motor torque output.

In an alternative embodiment, from a cold start, a portion (e.g., half) of the cylinders may be retarded with respect to MBT and another portion (e.g., half) of the cylinders may be advanced or over-advanced with respect to MBT to concurrently increase exhaust heat and engine coolant temperature to provide heat more quickly to the cabin while still increasing catalyst temperature. In this case, to maintain idle engine speed for example, the nominally retarded cylinders may further retard to decrease engine torque and advance to increase engine torque. Further, the nominally advanced cylinders may further retard (while remaining advanced relative to MBT) to increase engine torque and may advance to decrease engine torque. In this case with half of the cylinders retarded with respect to MBT and half of the cylinders advanced with respect to MBT, to maintain idle engine speed, for example in response to a drop in idle engine speed, the nominally retarded cylinders may advance (while remaining retarded relative to MBT) to increase engine speed and the nominally advanced cylinders may retard (while remaining advanced relative to MBT) to increase engine speed. In yet another example, the spark timing may not be modulated for idle speed control and the motor torque output may be modulated to maintain idle speed. Additionally, the engine may operate with some cylinders (over) advanced and some (over) retarded, and further may do so during transitions between the various modes described herein, such as the first, second, and/or third modes.

Further, less than all of the cylinder(s) may be selected for spark timing adjustment to modulate engine torque while other cylinder(s) may not modulate engine torque. In one example, half of the cylinders may have spark timing at MBT and half of the cylinders may be nominally retarded. Thus, the idle engine speed responsive cylinders can be advanced to increase engine torque or retarded to decrease engine torque (while remaining retarded relative to MBT).

It should be appreciated that still further idle speed control modes may be used, if desired.

Figure 4:
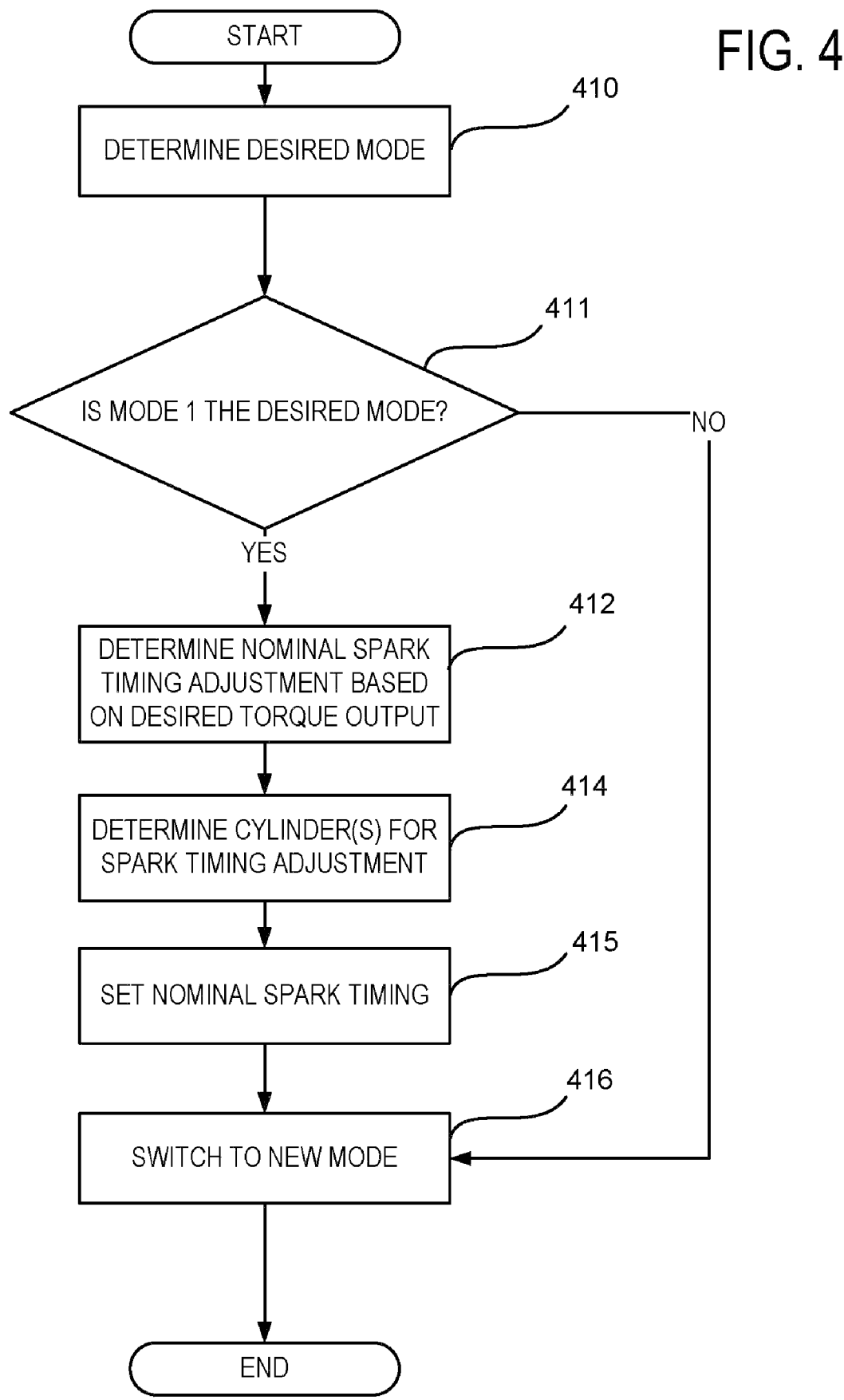
FIG. 4 is a flowchart for controlling transitions between different idle speed control modes.

In the event that the routine selects a mode that is different than a current operating mode, the engine may transition between the idle speed control modes. FIG. 4 illustrates example control for various idle speed mode transitions, once a mode transition has been identified.

Specifically, at 410, the routine determines the desired mode as described with regard to FIG. 3. Then, at 411, the routine determines if mode 1 is the desired mode, for example. If the answer is yes at 411, the routine proceeds to determine a nominal spark timing retard or advance based on operating parameters 412, including the engine torque produced by the current spark timing.

Next, the cylinder(s) to receive the nominal spark timing retard or advance in the new mode are determined at 414, based on, for example, desired time to catalyst light-off or $T_C$, engine speed, engine load, engine temperature, etc. As noted above, various cylinders may be operated with different relative spark timings.

The nominal spark timing is set in the determined cylinder(s) at 415 and the transition to the new mode is executed at 416.

Also, if mode 1 is not the desired mode at 411, the transition to the new mode is executed at 416. The cylinders may be transitioned in a single engine cycle from, for example, a retarded timing relative to peak torque timing to an advanced timing relative to peak torque timing. For example, if the engine is in mode 2 and is producing a torque TQ and the desired mode is mode 1, the retarded spark timing relative to MBT that produces a TQ may be determined as the new spark timing. Thus, by selecting the spark timing retard at a level producing the same torque as previously produced with advanced timing, a smooth transition may be achieved. Alternately, smooth transitions may be made by increasing or decreasing motor torque output. Then, if the desired nominal spark advance is different from the advance that produces constant or the desired torque, the routine may further gradually adjust spark timing to the desired nominal value, adjust motor torque output, and/or adjust airflow via throttle opening to counteract any torque disturbance. These gradual adjustments are described with respect to FIGS. 5-8.

Figure 5:
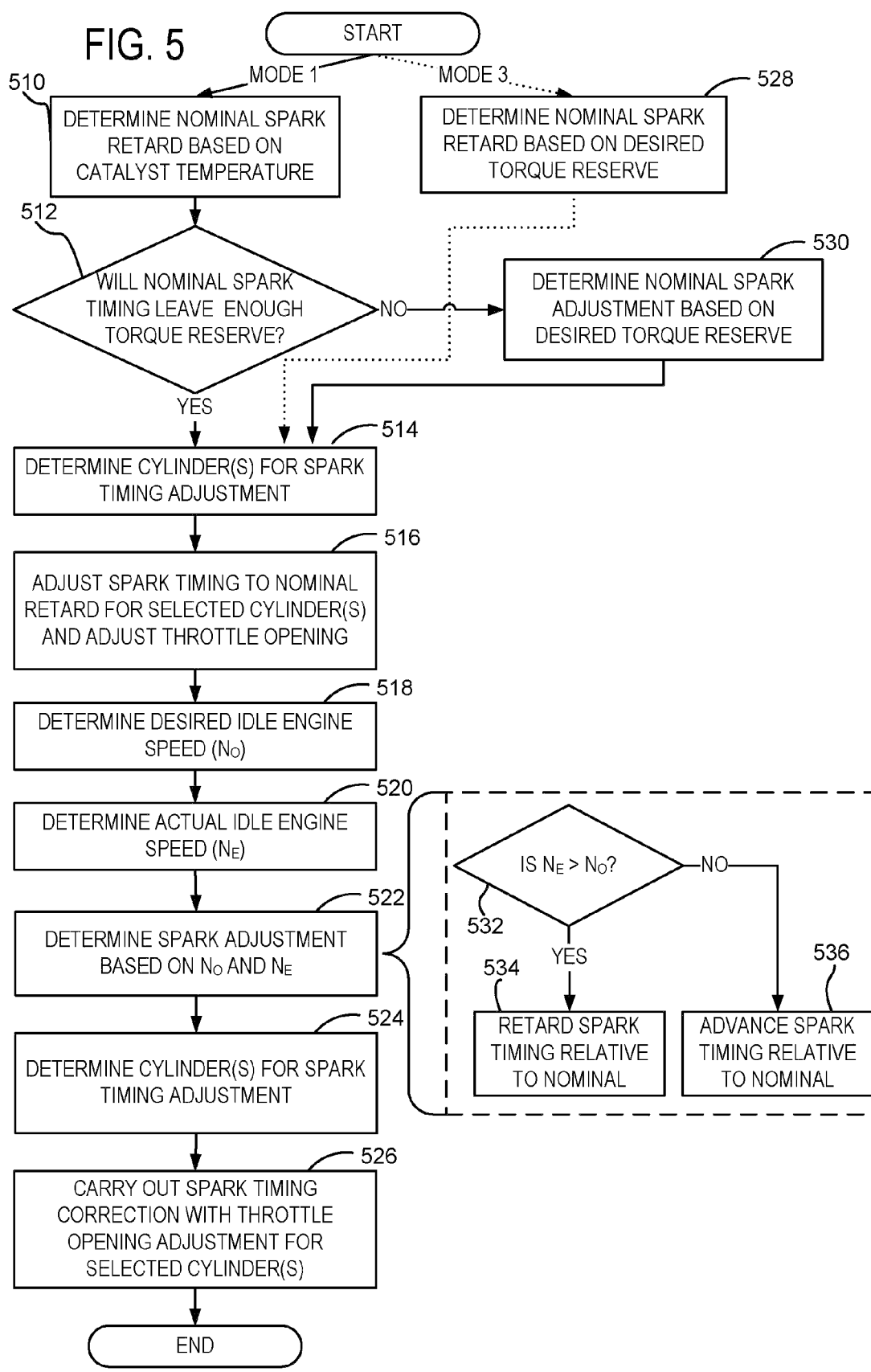
FIGS. 5-7 are flowcharts for idle engine speed control for various idle speed control modes.

Referring now to FIG. 5, it illustrates example control for idle speed modes 1 and 3. First, if mode 1 is determined as the desired mode, a nominal spark adjustment based on the catalyst temperature is determined at 510. For example, if the nominal spark retard based on a desired torque output at 412 is greater than the nominal spark retard based on catalyst temperature from 510, the spark timing adjustment may include an advance relative to the timing selected in 412 to achieve the nominal spark timing 510. If the nominal spark timing provides sufficient torque reserve as determined at 512, the routine then determines at 514 the cylinder(s) that will undergo spark timing adjustment. In one example, one cylinder may undergo the spark timing adjustment prior to another cylinder undergoing the spark timing adjustment to smooth the transition in torque output. Further, in one example, the nominal spark advance is gradually achieved together with a reduction of airflow via throttle opening, so that an abrupt change in engine torque does not occur 516. An example of such operation is described further with regard to FIG. 8. In yet another example, the nominal spark advance may be achieved concurrent with a decrease in motor torque output to prevent deviations in idle engine speed.

Once the nominal spark timing is achieved at 516, the desired idle engine speed $N_O$ and the actual idle engine speed $N_E$ are determined 518, 520 and the next spark timing adjustment based on these values, to achieve desired idle engine speed $N_O$ is determined at 522. The desired idle speed may be in a range of approximately 500-1300 RPM in one example. The spark adjustment is specifically determined as described at step 532. That is, in mode 1, spark timing is nominally retarded relative to MBT; thus, if $N_E$ is greater than $N_O$ as determined at 532, as may occur if a load is removed from the engine, an adjustment in spark timing that further retards the timing relative to the peak torque timing is determined at 534. Alternately, if engine speed is less than the desired speed 532, as may occur if power steering is engaged, for example, a spark timing advance relative to the nominal spark timing is determined at 536.

At 524, the cylinder(s) responsive to the speed error are determined. Selection of the cylinder(s) may be based on, for example, magnitude of spark timing adjustment, engine load, cylinder pressure, etc. One or more cylinders may undergo the spark timing adjustment, such as noted above with regard to the various different implementations of the idle speed control modes. In one example, where spark timing of all of the cylinders is nominally retarded, the timing of each cylinder is adjusted as determined to maintain the desired idle speed. Finally, spark timing corrections are implemented in the selected cylinder(s) along with airflow changes via throttle opening adjustment at 526 to maintain idle speed while also maintaining the desired nominal spark timing. Alternately, an adjustment in motor torque output may be carried out concurrently with the spark timing adjustments at 516 and 526 to maintain idle engine speed. Further, in one example, a proportional-integral controller may adjust spark timing responsive to the difference between the desired idle speed and the actual engine speed. Further still, a feedback gain of the spark timing adjustment may be adjusted according to the number of cylinders undergoing the adjustment, with a higher gain (for greater adjustment) selected when fewer cylinders have spark timing adjusted to maintain a desired idle speed. However, various other control structures may also be used.

If the nominal spark retard based on catalyst temperature does not provide sufficient torque reserve 512, a new nominal spark retard, further retarded from peak torque timing, is determined based on the desired torque reserve at 530 and the routine continues then to 514.

If mode 3 is determined to be the desired mode (e.g., catalyst heating has been achieved), a nominal spark retard based on the desired torque reserve is determined at 528 and the routine continues to 514.

Thus, by the methods described above, it is possible to provide desired catalyst heating or sufficient torque reserve, while also accurately controlling idle speed to the desired value.

Figure 6:
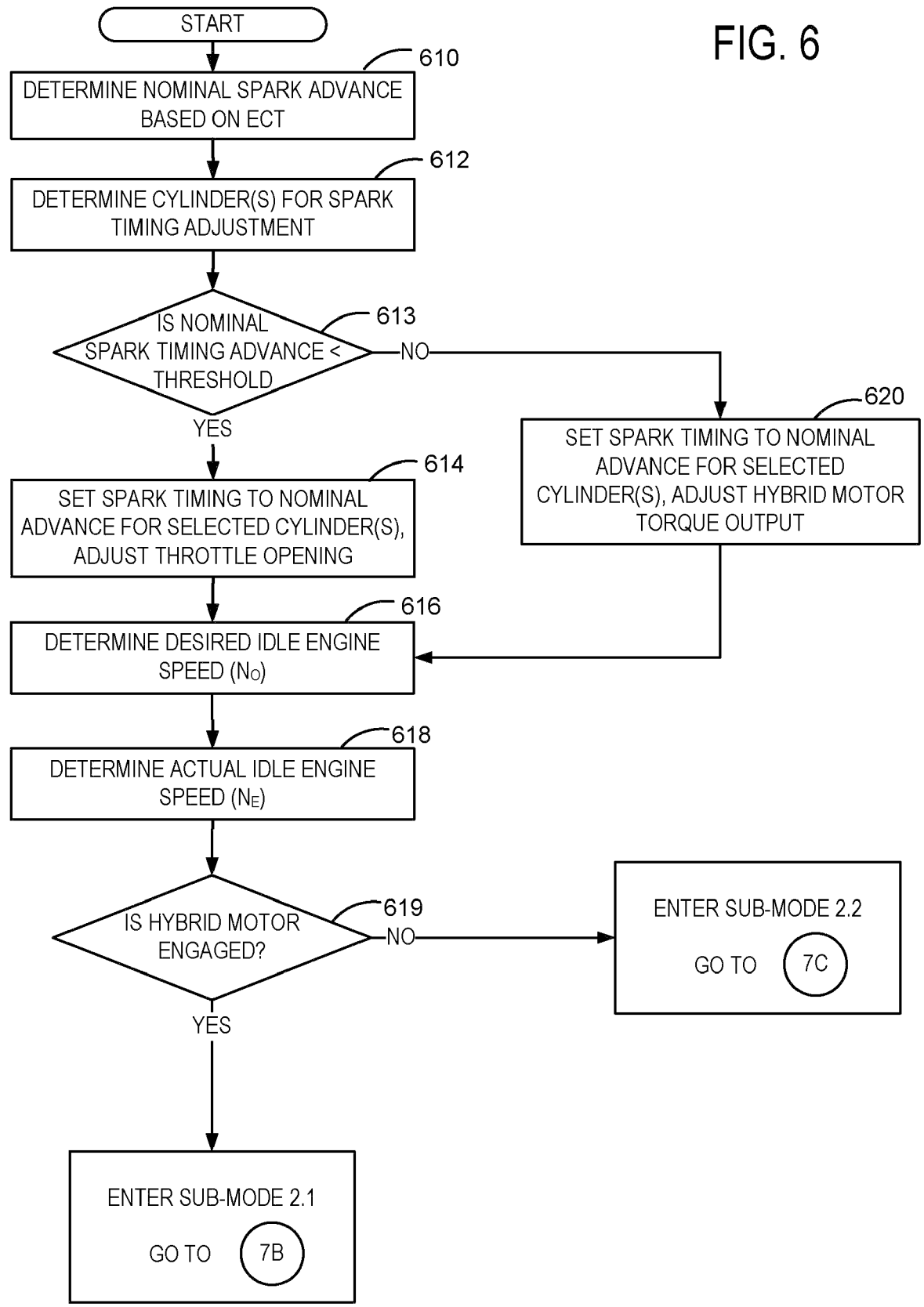

Referring now to FIG. 6, it illustrates example control for idle speed mode 2 where cabin heating may be requested or in progress. A nominal spark advance based on the ECT is determined at 610 and the cylinders to undergo said advance are determined at 612. Next, it is determined if the new nominal spark timing (e.g., after adjustments based on 610) will leave a sufficient torque reserve for idle engine speed control by determining if the spark timing advance is below a threshold 613. If the nominal spark advance is above a threshold such that it will result in insubstantial engine torque output, a hybrid motor, for example, may be engaged to maintain the idle engine speed concurrent with the setting of the nominal spark timing advance for selected cylinder(s) 620 such that engine torque output is maintained throughout the spark timing transition and throughout operation at this second mode. If the nominal spark advance is below the predetermined threshold such that sufficient torque reserve will exist after the spark timing adjustment, the routine proceeds to 614 where spark timing is advanced (without engagement of the hybrid motor) and idle engine speed is maintained by adjusting the throttle opening 614. In another embodiment, engine torque reserve below a given threshold may be checked after setting the spark timing advance. In another mode (not shown), the energy conversion device, spark timing, and throttle opening may all be adjusted during idle engine speed to maintain idle engine speed.

As noted herein, various implementations of the idle speed control modes may be used. In the current example, the nominal spark advance may be gradually achieved together with an engagement of the motor to power the engine, and a reduction of airflow via throttle opening, so that an abrupt change in engine torque does not occur. Further, one cylinder may undergo the spark timing adjustment prior to another cylinder undergoing the spark timing adjustment to smooth the transition in torque output.

In the case that the determined nominal spark advance is above a threshold 613, the nominal spark advance may be significantly over-advanced such that substantially no positive torque is produced by the engine and the hybrid motor is used to maintain the engine rotation at the desired speed. In another example, all of the cylinders may be alternately over-advanced such that positive torque is still provided to the vehicle and the hybrid motor may or may not supplement torque. In still another example, some of the cylinders may be over-advanced while others are not such that substantially no positive torque is produced by those cylinders and the engine output and idle engine speed is maintained by the non-overly-advanced cylinders (with ignition timing at MBT, retarded from MBT, or advanced of MBT). In another example, all of the cylinders may be alternately over-advanced such that positive torque is still provided to the vehicle. In still another example, some of the cylinders may be over-advanced while others are advanced, but not so overly advanced such that positive torque is provided to the engine via the advanced, but not-overly-advanced cylinders.

Further, in yet another example with some cylinders having a nominal advance past MBT and some having a nominal retard from MBT, idle speed control can also be achieved with both groups of cylinders, where the advanced cylinders retard spark timing, and the retarded cylinders advance spark timing, in response to a drop in engine speed. Further, in this example, the advanced cylinders may be overly advanced so that when idle speed is at the desired value, they produce substantially no torque, but when they are retarded toward MBT in response to a speed drop, they produce substantial positive torque to return the engine to its desired idle speed. In examples where some cylinders are advanced relative to MBT and some are retarded relative to MBT, the nominal values for such operation may be selected to balance cylinder torque among both the advanced and retarded cylinders. Finally, various combinations of the above modes may be used. For example, overly advanced timing of at least some cylinders, in combination with some cylinders operating at a nominal spark retard, and some cylinders near MBT, both advancing toward MBT of the retarded cylinders and retarding toward MBT of the overly advanced cylinders may be used to increase torque in response to a speed drop during idle conditions.

In these ways, idle engine speed can be maintained while concurrently increasing engine coolant temperature.

When the nominal spark timing is set at 614 or 620, desired idle engine speed $N_O$ 616 and actual idle engine speed $N_E$ 618 are determined. In one example, if the motor is engaged 619, the routine continues by entering sub-mode 2.1 at 7B. Otherwise, the routine continues by entering sub-mode 2.2 at 7C.

Figure 7:
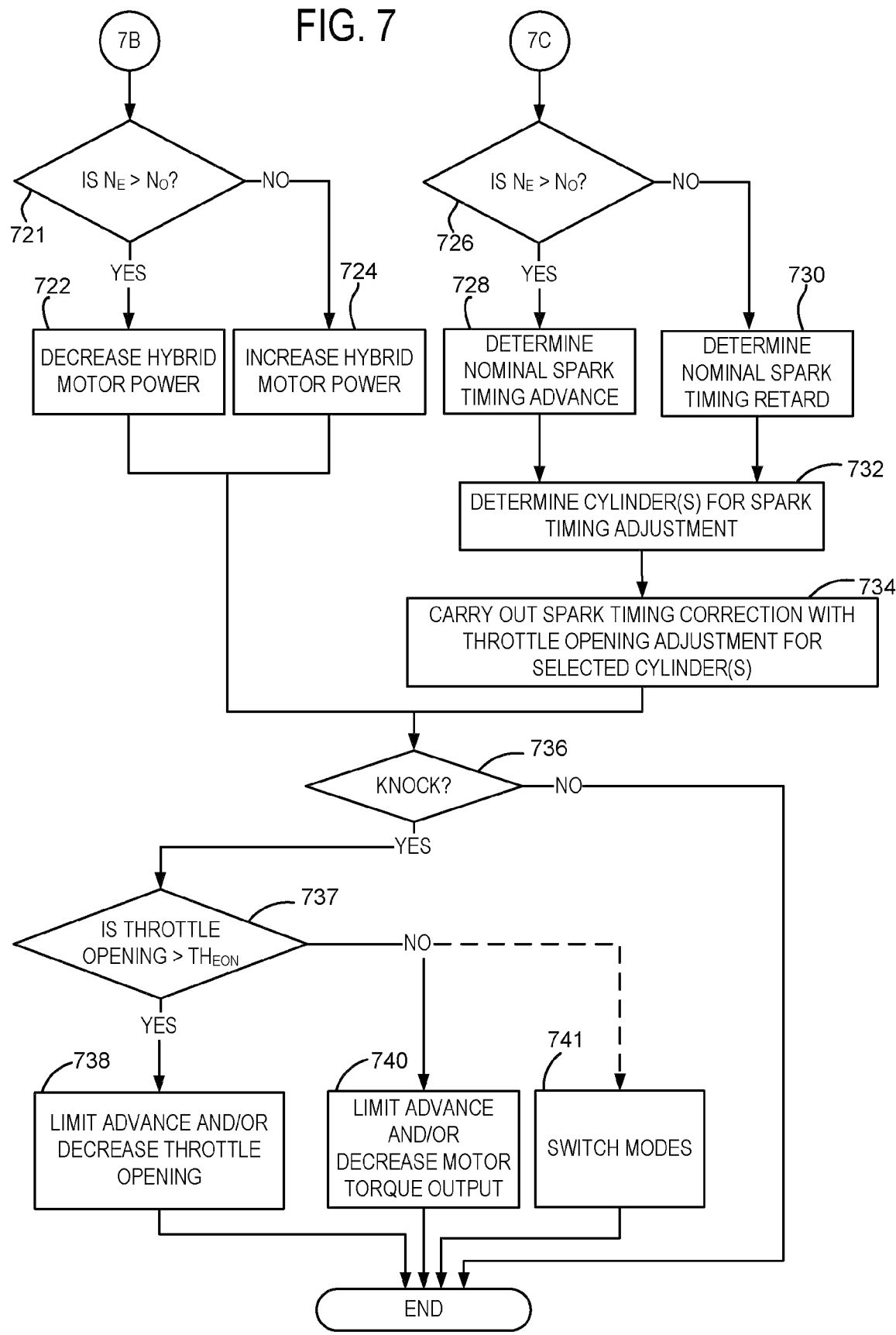

Referring now to FIG. 7, at 7B in the assist sub-mode 2.1, if $N_E$ is greater than $N_O$ 721, motor torque output will be decreased to reduce idle engine speed 722 to $N_O$; accordingly, if $N_E$ is less than $N_O$ 721, motor torque output will be increased to increase idle engine speed 724.

At 7C, wherein the motor torque output is supplementing engine torque, spark timing adjustments are determined based on desired and actual engine speed 726. In this example control routine for idle speed sub-mode 2.2, spark timing is nominally advanced relative to MBT; thus, if $N_E$ is greater than the $N_O$ 726, as may occur if a load is removed from the engine for example, an adjustment in spark timing that further advances the timing relative to MBT is determined at 728. Alternately, if $N_E$ is less than $N_O$ 726, as may occur if power steering is engaged, for example, a spark timing retard relative to the nominal spark timing is determined at 730. Thus, the control of engine torque output via spark timing adjustments in mode 2 is directionally opposite to modes 1 and 3.

At 732, the cylinders responsive to the speed error are determined. Selection of the cylinders may be based on, for example, magnitude of spark timing adjustment, engine load, cylinder pressure, etc. One or more cylinders may undergo the spark timing adjustment, such as described above with regard to FIG. 6, for example. Finally, spark timing corrections are implemented in the selected cylinder(s) along with airflow changes via throttle opening adjustment at 734 to maintain idle speed. In this way, it is possible to provide desired cabin heating while also accurately controlling idle speed to the desired value.

In one example, a proportional-integral controller may adjust spark timing or hybrid motor torque output responsive to the difference between the desired idle speed and the actual engine speed. Further, throttle adjustments may also be coordinated to further control idle engine speed, while also maintaining spark timing on average at the desired nominal value. Further still, a feedback gain of the spark timing adjustment may be adjusted according to the number of cylinders undergoing the adjustment, with a lower gain (for less adjustment) selected when more cylinders have spark timing adjusted to maintain a desired idle speed. Further, a feedback gain of hybrid motor torque output may be adjusted based on the spark timing adjustment and the cylinders undergoing the adjustment. However, various other control structures may also be used.

Next, it is determined if cylinder pressure has exceeded some threshold or if there is knocking 736, for example by accelerometers, ionization sensors or combustion pressure sensors in the cylinder(s). If yes, it may be determined if the throttle is above a minimum threshold $TH_{EON}$ 737. If yes, the advance can be limited concurrent with a decrease in throttle opening to avoid knocking while maintaining the idle engine speed 738. Further, motor torque output may be decreased at 738 if operating in assist sub-mode 2.1, for example. If the answer is no at 737, spark timing advance may be limited (and the hybrid motor torque output may be reduced if in assist sub-mode 2.1) to avoid knocking, while maintaining idle engine speed 740. Alternately, a change in modes may be selected 741. For example, the control may be switched from mode 2 to mode 3 (or some other mode not described herein) 741 wherein the spark timing may be retarded relative to MBT to avoid knocking. If there is no engine knocking at 736, the routine ends.

A prophetic example of idle engine speed control is illustrated in FIG. 8. Five time diagrams with a common time basis illustrate the spark timing, throttle opening, and motor torque output as a function of engine speed, engine coolant temperature, and catalyst temperature, among other parameters. In the bottom-most graph, the dotted line represents ECT and the solid line represents catalyst temperature.

A cold start is executed at t1, with the engine cranked and spark timing is held at MBT until the engine runs-up and idle conditions are met. In mode 1, spark timing is nominally retarded relative to MBT until catalyst light-off $T_{CAT}$ is met at t3. A disturbance to idle engine speed in mode 1, apparent at t2, may be caused, for example by use of power steering and may be controlled by nominally advancing spark timing as was described in FIG. 5. Spark timing is subsequently retarded to the nominal spark timing with concurrent coordination of throttle opening adjustment t2'. Further still, motor assist may also be used to maintain idle speed in additional to spark adjustments in mode 1. In another mode, for example, sub-mode 2.2, response to a similar disturbance may be controlled by a directionally opposite spark timing and throttle opening response, as described with respect to FIG. 7 above.

At t3, there is a switch to assist sub-mode 2.1 in this example so that spark timing is nominally advanced a magnitude $\Delta T_M$ relative to the nominal spark timing. The magnitude $\Delta T_M$ may achieve an over-advanced spark timing such that substantially no torque is produced by the engine. Here, the throttle opening is adjusted to regulate the amount of heating, while maintaining burning and combustion of the air-fuel mixture at t3' and motor torque output increases to maintain idle engine speed. In another example, spark timing may be advanced but still producing substantial torque and the motor torque output may supplement the engine output torque to maintain idle engine speed. A disturbance to idle engine speed at t4, may be controlled by transiently increasing motor torque output at t4'.

When the desired engine coolant temperature $T_{ECT}$ has been reached, a switch to mode 3 occurs at t5, such that spark timing is retarded a magnitude $\Delta T_T$ relative to MBT to a nominal value not necessarily equal to that of mode 1 such that less excess engine heat can be sent to exhaust outtake and improved fuel consumption may be achieved. Further, throttle opening is increased and motor torque output torque is decreased at t5 so as to not disturb idle engine speed. The vehicle may remain in mode 3 while in idle speed control. However, in some examples, even after a significant duration of engine or vehicle operation, if the vehicle idles for an extended duration in a significantly cooler ambient temperature, increased cabin heating may be requested, especially in vehicles with large cabin volumes with multiple heating regions. In such an example, the system may be operated in mode 2 to provide the desired cabin heating.

Note that the example control and estimation routines that are depicted by the above process flows can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle engine having cylinders and an electric motor configured to rotate the engine, comprising:
   during engine idling and responsive to a cabin heating request, but after catalyst light-off,
      advancing spark timing of a cylinder to substantially before a peak torque timing (MBT); and
      retarding the spark timing of the cylinder toward MBT and increasing motor torque output in response to a decrease in engine speed to maintain engine idle speed.

2. The method of claim 1 wherein advancing the spark timing includes advancing the spark timing sufficiently such that the cylinder generates insufficient torque to maintain rotation of the engine at a desired idle speed, the method further comprising adjusting the motor torque output responsive to engine speed.

3. The method of claim 2, where advancing spark timing is carried out responsive to the request for cabin heating and when engine coolant temperature is below a predetermined threshold temperature.

4. The method of claim 1 wherein the electric motor is coupled to a crankshaft of the engine.

5. The method of claim 1, wherein the electric motor is coupled to a crankshaft of the engine.

6. The method of claim 1, further comprising:
   during the engine idling,
      adjusting both spark timing and motor torque output in response to a difference between a desired idle speed and measured engine speed, where spark timing of the cylinder is retarded toward MBT to increase engine output torque, and
      adjusting a degree of spark advance and motor torque output responsive to a battery state of charge.

7. The method of claim 1, where a degree of advancement of the spark timing is adjusted in response to engine coolant temperature.

8. The method of claim 1, where the request for cabin heating is based on engine coolant temperature below a predetermined threshold temperature and catalyst light-off is based on catalyst temperature above a threshold catalyst temperature.

9. A method for engine cylinders and an electric motor coupled to the engine, comprising:
   during engine idling after catalyst light-off,
      operating a first cylinder with advanced spark timing substantially before a peak torque timing (MBT) and a second cylinder with retarded spark timing substantially after MBT; and
      retarding the first cylinder toward MBT, advancing the second cylinder toward MBT, and increasing motor output torque in response to a decrease in engine speed.

10. The method of claim 9, where advancing spark timing of the first cylinder is carried out responsive to a request for cabin heating and when engine coolant temperature is below a predetermined threshold temperature.

11. A method for engine cylinders and an electric motor coupled to the engine, comprising:
   during engine idling and after catalyst light-off,
      operating a first cylinder with advanced spark timing substantially before a peak torque timing (MBT) and a second cylinder with spark timing substantially at MBT; and
      retarding the first cylinder toward MBT and increasing motor output torque while maintaining the second cylinder at MBT, in response to a decrease in engine speed.

12. The method of claim 11, where advancing spark timing of the first cylinder is carried out responsive to a request for cabin heating.

13. The method of claim 11, where advancing spark timing of the first cylinder is carried out responsive to a request for cabin heating and when engine coolant temperature is below a predetermined threshold temperature.

* * * * *